J. M. PETERSON.
MEAT HOLDING MECHANISM.
APPLICATION FILED OCT. 21, 1915.
1,203,256.
Patented Oct. 31, 1916.
3 SHEETS—SHEET 1.
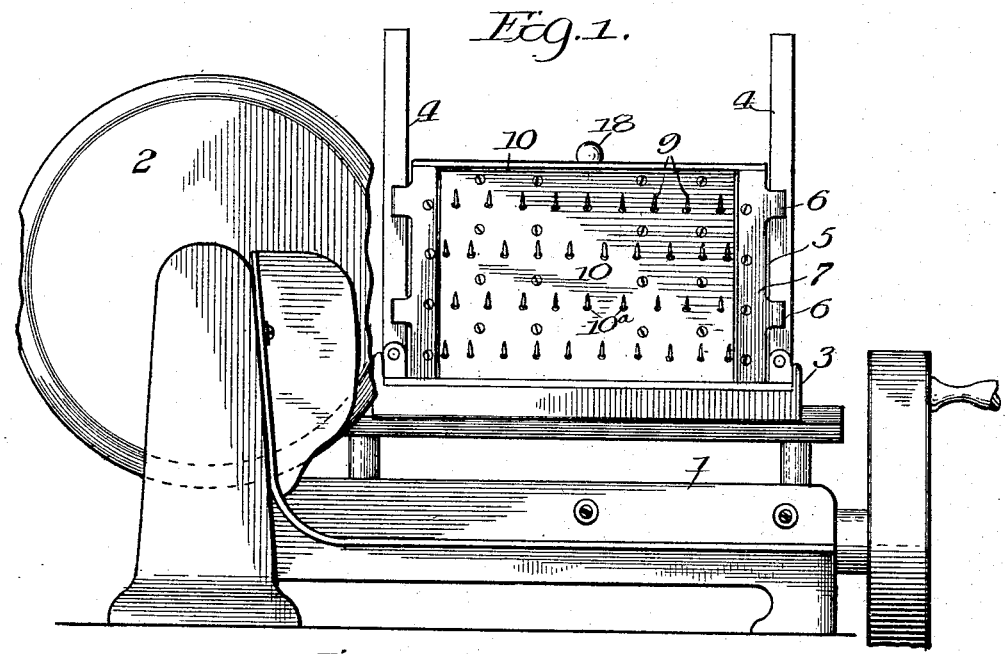
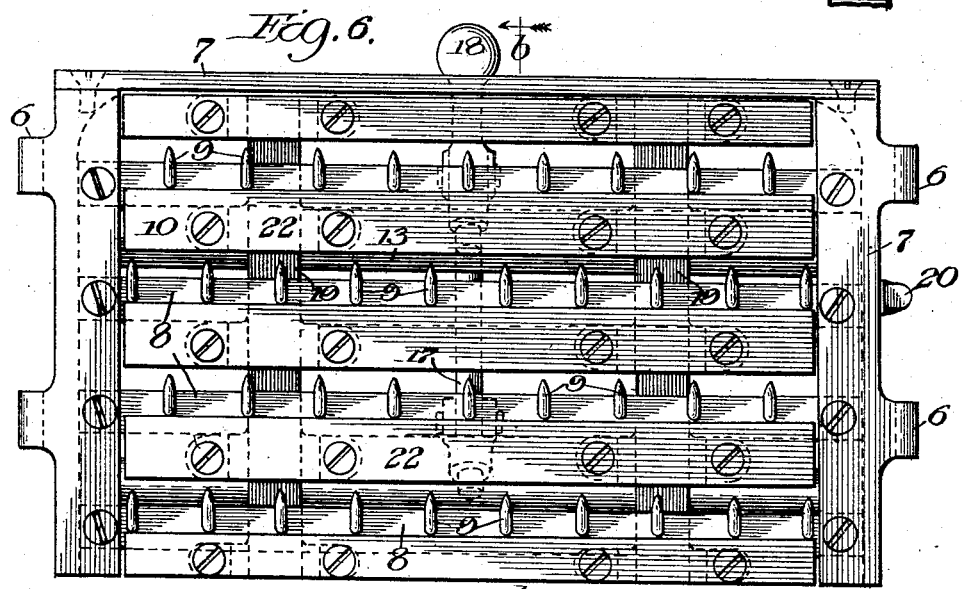

J. M. PETERSON.
MEAT HOLDING MECHANISM.
APPLICATION FILED OCT. 21, 1915.
1,203,256.
Patented Oct. 31, 1916.
3 SHEETS—SHEET 2.
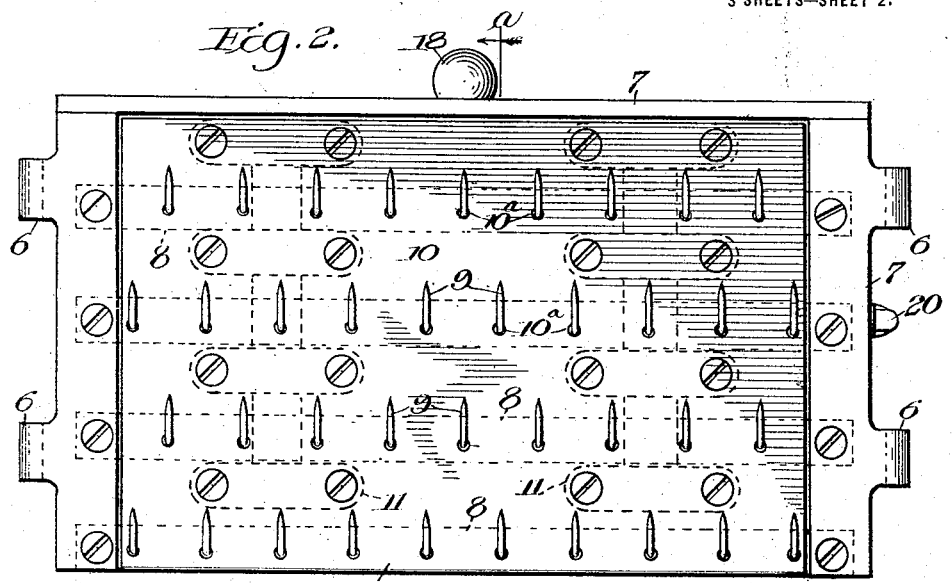
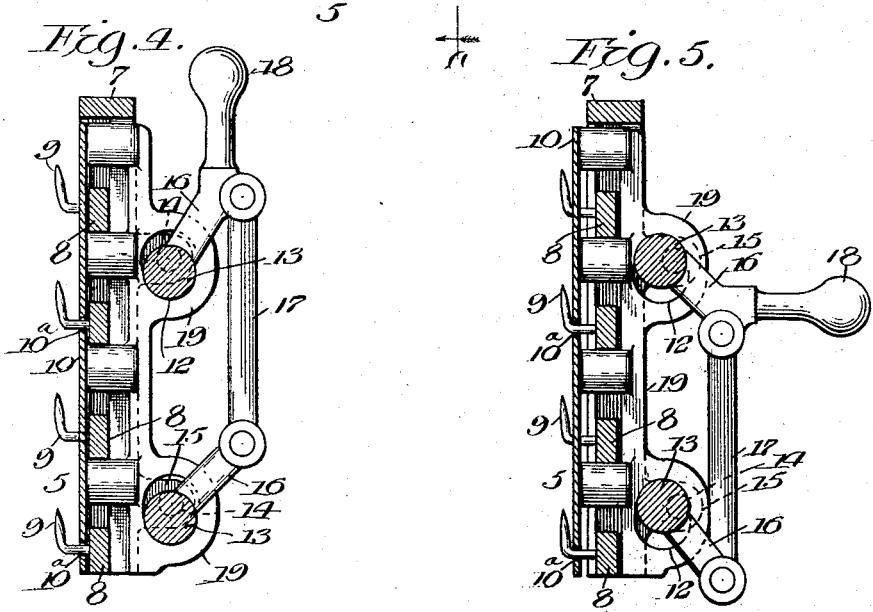
Inventor
John M. Peterson
by May W. Zabel
Atty.

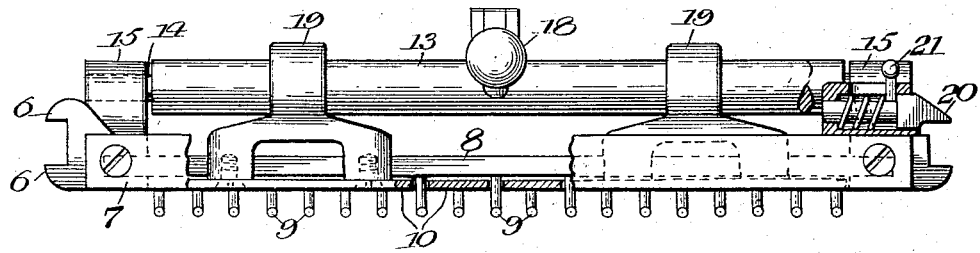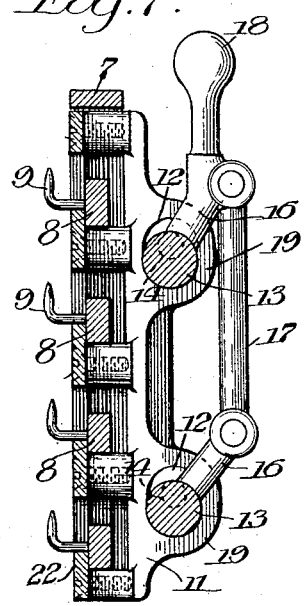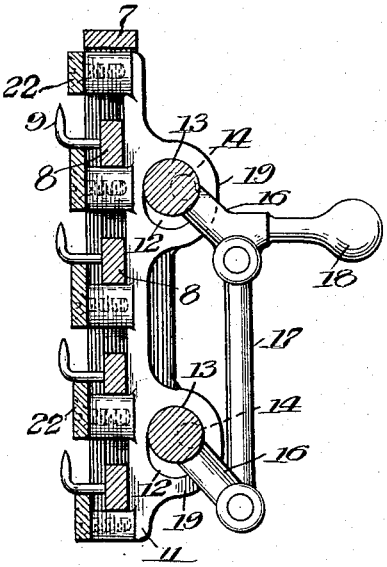

UNITED STATES PATENT OFFICE.

JOHN M. PETERSON, OF CHICAGO, ILLINOIS, ASSIGNOR TO GEORGE J. SAYER, OF CHICAGO, ILLINOIS.

MEAT-HOLDING MECHANISM.

1,203,256.          Specification of Letters Patent.          Patented Oct. 31, 1916.

Application filed October 21, 1915. Serial No. 57,023.

*To all whom it may concern:*

Be it known that I, JOHN M. PETERSON, a citizen of the United States, residing at Chicago, in the county of Cook and State of Illinois, have invented a certain new and useful Improvement in Meat-Holding Mechanism, of which the following is a full, clear, concise, and exact description, reference being had to the accompanying drawings, forming a part of this specification.

My invention relates to meat holding mechanism and more particularly to such devices when applied to the ordinary style of meat slicing machines using a rotary knife and a reciprocating table. Machines of this class usually have a pair of uprights which hold the meat clamps, and my improved device is adapted to be removably mounted on one part of these uprights so that the meat may be fastened to the device, whereby it is held in a rigid position so that it can be sliced practically to the last thin slice.

I will explain my invention more in detail by referring to the accompanying drawings illustrating the same, in which—

Figure 1 is a front elevation of a meat slicing machine showing my improvement secured thereto; Fig. 2 is a front elevation showing more in detail the construction of my improved meat holding device; Fig. 3 is a top plan view of Fig. 2, some of the parts being broken away; Fig. 4 is a sectional view on line *a—a* of Fig. 2; Fig. 5 is a view similar to Fig. 4 showing the parts in an alternative position; Fig. 6 is a front view of a modified form of device; Fig. 7 is a section on line *b—b* of Fig. 6, and Fig. 8 is a view similar to Fig. 7 showing the parts in alternative position.

In general I may say that a slicing machine has a suitable base plate 1, slicing knife 2, reciprocating table 3, and uprights 4. My improved device 5 is adapted to be mounted upon the uprights, and for this purpose has lugs 6, 6, which form part of the framework 7 of my improved device. This framework 7 has cross pieces 8, 8 secured thereto, which cross pieces are provided with a plurality of hooks 9. These hooks as will be seen from an inspection of Fig. 4 protrude from the front of the device. The meat which it is desired to cut is then pressed against the hooks and forced downwardly a little, whereupon the hooks hold the meat in position. In order to clamp the meat on top of the hooks, I provide a movable plate 10 having perforations 10$^a$ through which the hooks 9 protrude. This movable plate is mounted upon a carriage 11, which carriage has openings 12 through which openings shafts 13 pass. These shafts at their extremities have eccentrically mounted pins 14, which eccentrically mounted pins extend into bearings 15 provided therefor upon the framework 7. The shafts each have projecting arms 16 fastened to them, which arms are united by a link 17, the upper shaft at the same time being provided with a handle 18. The shafts as stated pass through the bearing portions 19 forming parts of the carriage 11. Thus when the handle 18 is moved as shown from the position of Fig. 4 to the position of Fig. 5, the carriage 11 is moved forwardly relatively to the hooks, thus carrying the plate 10 into the position shown in Fig. 5. In this position of Fig. 5, the meat is securely held, or clamped, between the plate and the hooks. By utilizing the plate 10 a substantially flat face is presented to the meat, and prevents any of the meat from coming in contact with the operating mechanism. It also has the additional advantage of permitting the device to be more readily and easily cleansed. A spring catch 20 is provided which is controlled by the stem 21 so that the device can be readily inserted and withdrawn from its position upon the uprights. This spring catch 20, referring to Fig. 2, is movable toward the left when it is designed to place the device in position or to remove it.

In the construction of the device as disclosed in Figs. 6, 7 and 8, a plurality of movable strips 22 are utilized, which perform the same function as the plate 10, and which coöperate with the hooks 9. The means whereby said strips may be moved, is as shown identical with that disclosed in Figs. 1 to 5 inclusive. In this construction the meat is clamped under the hooks. It is of course not necessary to move the strips 22 forwardly as far as shown in Fig. 8, and same are preferably not moved within the spaces between the strips 22, but protrude therefrom only the thickness of the material of the hooks.

From what has been described the nature of my invention will be readily clear to those skilled in the art, and

Having thus described my invention, what I claim as new and desire to secure by Letters Patent is:—

1. A meat holding device of the character described comprising a framework, a plurality of stationarily mounted hooks carried by said framework upon which the meat is adapted to be impaled, and clamping mechanism movable relatively to said framework and transversely of the plane of said hooks for clamping the meat to said hooks, relative movement between said mechanism and said hooks serving to compress the meat therebetween.

2. A meat holding device of the character described comprising a framework, a plurality of stationarily mounted hooks carried by said framework upon which the meat is adapted to be impaled, and strips movable relatively to said framework and transversely of the plane of said hooks for clamping the meat to said hooks, relative movement between said strips and said hooks serving to compress the meat therebetween.

3. A meat holding device of the character described comprising a framework, a plurality of stationarily mounted hooks carried by said framework upon which the meat is adapted to be impaled, clamping mechanism movable relatively to said framework and transversely of the plane of said hooks for clamping the meat to said hooks, relative movement between said mechanism and said hooks serving to compress the meat therebetween, and a spring catch for holding said device in position.

4. A meat holding device of the character described comprising a framework, a plurality of stationarily mounted hooks carried by said framework upon which the meat is adapted to be impaled, strips movable relatively to said framework and transversely of the plane of said hooks for clamping the meat to said hooks, relative movement between said strips and said hooks serving to compress the meat therebetween, and a spring catch for holding said device in position.

5. A meat holding device of the character described comprising a framework, a plurality of stationarily mounted hooks carried by said framework, clamping mechanism movable relatively to said framework and transversely of the plane of said hooks for clamping the meat to said hooks, relative movement between said mechanism and said hooks serving to compress the meat therebetween, a handle for moving said clamping mechanism, and an eccentrically mounted shaft interposed between said clamping mechanism and said framework.

6. A meat holding device of the character described comprising a framework, a plurality of stationarily mounted hooks carried by said framework, strips movable relatively to said framework and transversely of the plane of said hooks for clamping the meat to said hooks, relative movement between said strips and said hooks serving to compress the meat therebetween, a handle for moving said strips, and an eccentrically mounted shaft interposed between said strips and said framework.

7. A meat holding device of the character described comprising a framework, a plurality of stationarily mounted hooks carried by said framework, clamping mechanism movable relatively to said framework and transversely of the plane of said hooks for clamping the meat to said hooks, relative movement between said mechanism and said hooks serving to compress the meat therebetween, a spring catch for holding said device in position, a handle for moving said clamping mechanism, and an eccentrically mounted shaft interposed between said clamping mechanism and said framework.

8. A meat holding device of the character described comprising a framework, a plurality of stationarily mounted hooks carried by said framework, strips movable relatively to said framework and transversely of the plane of said hooks for clamping the meat to said hooks, relative movement between said strips and said hooks serving to compress the meat therebetween, a spring catch for holding said device in position, a handle for moving said strips, and an eccentrically mounted shaft interposed between said strips and said framework.

In witness whereof, I hereunto subscribe my name this 15th day of October, A. D., 1915.

JOHN M. PETERSON.

Witnesses:
 WM. SHEAPIN,
 EMMA KETTLER.